3,205,231
PHOSPHORIC, PHOSPHONIC, THIONOPHOSPHORIC OR THIONOPHOSPHINIC ACID ESTERS
Christa Fest, Wuppertal-Elberfeld, Germany, assignor to Farbenfabriken Bayer Aktiengesellschaft, Leverkusen, Germany, a German corporation
No Drawing. Filed Aug. 21, 1963, Ser. No. 303,663
Claims priority, application Germany, Aug. 24, 1962, F 37,660
13 Claims. (Cl. 260—251)

The present invention relates to and has as its objects new and useful phosphorous containing compounds. More specifically this invention is concerned with phosphoric, phosphonic, thionophosphoric or thionophosphinic acid-(2-fluoromethyl-4-methyl-pyrimidyl) esters of the general formula

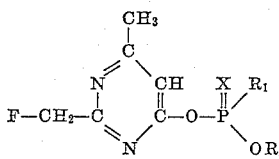

in which $R_1$ denotes an optionally halogen-substituted lower alkyl or alkoxy group, or an aryl radical, while $R_2$ stands for an optionally halogen-substituted lower alkyl radical and X stands for a chalkogen of an atomic weight less than 40.

From U.S. patent specification No. 2,754,243 phosphoric and thionophosphoric acid esters of 2-isopropyl-4-methyl-6-hydroxypyrimidine are already known. According to the data given in the aforesaid specification these compounds possess a very good insecticidal as well as acaricidal activity and are suitable therefore as active substances for the preparation of pest control agents.

In accordance with the present invention it has now been found that also insecticidally highly active phosphoric, phosphonic, thionophosphoric or thionophosphonic acid esters of the above constitution are obtained, by reacting 2 - fluoromethyl-4-methyl-6-hydroxy-pyrimidine with phosphoric, phosphonic, thionophosphoric or thionophosphonic acid halides of the general formula

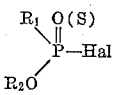

In the last mentioned formula the symbols $R_1$ and $R_2$ have the same significance as given above and Hal stands for a halogen atom.

The reaction according to the process of the invention is preferably performed in the presence of acid-binding agents. Primary examples of these are alkali metal carbonates, hydroxides or alcoholates. Instead of working in the presence of acid-binding agents it is also possible to prepare salts, preferably alkali metal salts of the above-mentioned pyrimidine-derivatives and to react these according to the inventive process with the corresponding phosphoric, phosphonic, thionophosphoric or thionophosphonic acid halides.

It has furthermore proved advantageous to carry out the process according to the invention in the presence of an inert organic solvent. For this purpose, lower aliphatic ketones and nitriles have proved especially valuable, such as acetone, methyl ethyl ketone, methyl isopropyl ketone and methyl isobutyl ketone, as well as acetonitrile and propionitrile. Finally it is expedient for attaining good yields and obtaining pure products of the process, to allow the reaction to proceed at slightly to moderately elevated temperatures (30 to 90° C., preferably 50 to 70° C.) and also to continue stirring the reaction mixture after combining the starting components, for a prolonged period, while heating.

The 2 - fluoromethyl-4-methyl-6-hydroxypyrimide required as starting material for the process according to the invention is hitherto not described in the literature, but it can be readily produced in the pure form according to methods known in principle by condensation of fluoroacetoamidine with acetoacetic acid ethyl ester. The compound is a solid crystalline substance of melting point 169° C.

The inventive phosphoric, phosphonic, thionophosphoric and thionophosphonic acid esters are mostly colourless to pale yellow, water-insoluble oils, which may be distilled under strongly reduced pressure, to some extent without decomposition.

The new compounds of the present invention very effectively kill insects like aphids, spider mites, caterpillars, flies, mosquito larvae etc. They are especially distinguished by an outstanding contact-insecticidal activity and also by a systemic action. Moreover they possess an activity on eating insects such as caterpillars and to some extent a strongly anthelmintic action. Most surprisingly they are of remarkable low toxicity against warm-blooded animals.

On account of these technically extremely valuable properties the compounds according to the invention are employed as pest control agents in plant protection as well as in veterinary medicine. They may be used in the same manner as other known phosphoric insecticides, i.e. in a concentration from about 0.00001% to about 1%, diluted or extended with suitable solid or liquid carriers or diluents. Examples for such solid carriers are talc, chalk, betonite, clay and the like, as liquid carriers there may be mentioned water (if necessary with commercial emulsifiers), alcohols especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae (I)

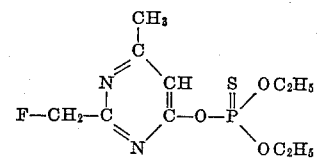

(II)

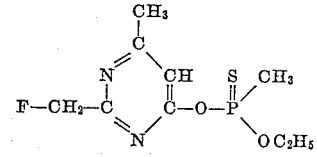

(III)

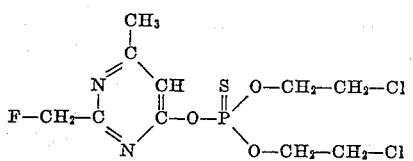

have been tested against aphids (compound III), spider mites (compound I), caterpillars (compound I), flies (compound II) and mosquito larvae (compounds II and III). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate (in percent) |
|---|---|---|
| III | 0.01 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| I | 0.0008 | 90 |

(c) Against caterpillars of the type diamond black moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours.

The following results have been obtained:

| Compound | Aqueous concentration (in percent active ingredient/water) | Killing rate (in percent) |
|---|---|---|
| I | 0.01 | 100 |

(d) Against flies: About 50 flies (*Musca domestica*) are placed under covered petri dishes in which drip-wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| II | 0.0008 | 100 |

(e) Against mosquito larvae of the type *Aedes aegypti*: About 8–12 mosquito larvae are placed under covered petri dishes in which drip wet filter papers have been placed which were sprayed with an insecticidal solution of a concentration as shown below and prepared as indicated above. Evaluation occurred after 10 days.

The following results have been obtained:

| Compound | Aqueous concentration (in percent active ingredient/water) | Killing rate (in percent) |
|---|---|---|
| II | 0.0001 | 100 |
| III | 0.001 | 100 |

The following examples provide an illustration of the invention as claimed:

Example 1

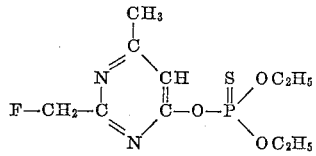

57 g. (0.4 mol) of 2-fluoromethyl-4-methyl-6-hydroxypyrimidine are suspended together with 56 g. of dry and sifted potassium carbonate in 150 cc. of methyl ethyl ketone. 76 g. (0.4 mol) of O,O-diethyl-thionophosphoric acid chloride are added dropwise to this suspension at 40° C. with stirring; the temperature of the reaction mixture rises to about 60° C. The mixture is then heated at 60 to 70° C. for about 3 hours with further stirring, then poured into 100 cc. of ice-water and finally stirred with 300 cc. of benzene. The benzenic solution is separated, washed with water and dried over sodium sulphate. After evaporating the solvent, there are obtained by fractional distillation, 78 g. (66.5% of the theoretical yield) of the compound of the above-mentioned structure in the form of a colourless, water-insoluble oil of B.P. 95° C. at 0.01 mm. Hg.

The mean toxicity ($DL_{50}$) of the product amounts to about 17 mg. per kg. of animal on rats per os. Caterpillars are completely destroyed by 0.01% solutions of the ester and spider mites are skilled 90% even by 0.0008% solutions.

Example 2

64 grams (0.04 mol) of O,O-dimethyl-thionophosphoric acid chloride are added dropwise at 60° C. with stirring to a suspension of 57 grams (0.4 mol) of 2-fluoromethyl-4-methyl-6-hydroxypyrimidine and 56 grams (0.4 mol) of dry and sifted potassium carbonate in 200 cc. of acetonitrile. The reaction mixture is then heated for a short time to 60° C. and then stirred for 5 hours while it slowly cools. The mixture is then shaken with a little water and benzene. After drying the organic phase over sodium sulphate and distilling off the solvent, a compound of the structure as given above remains in the form of a yellow brown oil. The yield amounts to 92 grams (86.3% of the theoretical). On rats per os the product possesses a mean toxicity ($DL_{50}$) of 50 milligrams per kg. of animal.

Spider mites are killed 60% by 0.004% solutions of the ester. The systemic action of 0.004% solutions of the compound against aphids is 100%.

Example 3

57 grams (0.4 mol) of 2-fluoromethyl-4-methyl-6-hydroxypyrimidine are suspended together with 56 grams of dry and sifted potassium carbonate in 150 cc. of acetonitrile and there are added at 50° C. to this suspension with stirring 63 grams (0.4 mol) of methyl-thionophosphonic acid-O-ethyl ester chloride. The temperature of the reaction mixture rises to about 70° C. The mixture is then heated to the stated temperature for a further 3 to 4 hours and then worked up as described in Example 1. There are obtained 65 grams (61.4% of the theoretical yield) of the compound of the above formula of B.P. 95° C. at 0.01 mm. Hg.

On rats per os the mean toxicity (DL$_{50}$) of the compound amounts to about 38 mg./kg. of animal.

Flies are completely destroyed by 0.0008% solutions, mosquito larvae even by 0.0001% solutions of the ester.

*Example 4*

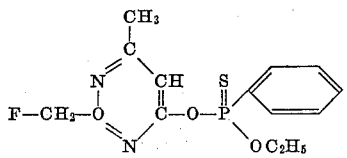

A suspension of 57 grams (0.4 mol) of 2-fluoromethyl-4-methyl-6-hydroxypyrimidine and 56 grams of dry and sifted potassium carbonate in 150 cc. of methyl ethyl ketone is added dropwise at 50 to 60° C. with stirring, to 88 grams (0.4 mol) of phenyl-thionophosphonic acid-O-ethyl ester chloride. The reaction mixture is then heated at 60° C. for 12 hours and then worked up as described in the preceding examples. 85 grams (65% of the theoretical yield) of the product of the formula as given above are obtained as a yellow oil of B.P. 130° C. at 0.01 mm. Hg.

On rats per os the mean toxicity (DL$_{50}$) of the compound amounts to 50 mg. per kg. of animal.

Aphids are completely destroyed by 0.01% solutions of the ester and mosquito larvae are still killed 95% even by 0.0001% solutions.

*Example 5*

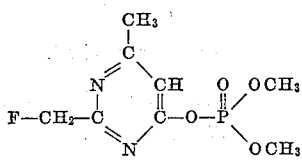

57 grams (0.4 mol) of 2-fluoromethyl-4-methyl-6-hydroxypyrimidine are suspended together with 56 grams of dry, sifted potassium carbonate in 200 cc. acetonitrile. 46 grams (0.4 mol) of O,O-dimethylphosphoric acid chloride are added to this suspension at 50° C. with stirring, the reaction mixture is stirred for a further two hours at the aforesaid temperature, then poured into a little water and extracted with 300 cc. of benzene. After distilling off the solvent from the separated and dried organic layer, the product of the above structure is obtained in the form of a yellow oil of B.P. 115° C. at 0.01 mm. Hg. The yield amounts to 45 grams (45% of the theoretical).

On rats per os the mean toxicity of the compound amounts to 250 mg. per kg. of animal.

Spider mites are completely destroyed by 0.01% solutions, mosquito larvae even by 0.0001% solutions of the ester.

*Example 6*

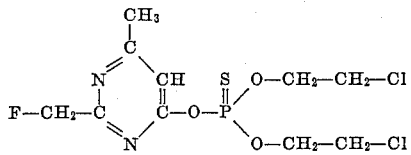

104 grams (0.4 mol) of O,O-di-(β-chloro-ethyl)-thionophosphoric acid chloride are added dropwise at 50° C. to a suspension of 57 grams (0.4 mol) of 2-fluoromethyl-4-methyl-6-hydroxypyrimidine and 56 grams of dry and sifted potassium carbonate in 200 cc. of methyl ethyl ketone. The reaction mixture is then boiled under reflux for 24 hours, then poured into a little water and extracted with benzene. After distilling off the solvent from the separated organic layer the product of the above constitution is obtained in the form of a yellow brown oil. The yield amounts to 106 grams (73.5% of the theoretical). On rats per os the compound possesses a mean toxicity of 500 mg. per kg. of animal.

Aphids are killed 100% by 0.01% solutions of the ester, mosquito larvae even by 0.001% solutions.

*Example 7*

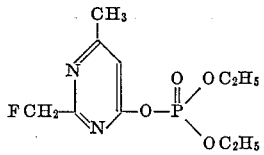

42 grams (0.3 mol) of 2-fluoromethyl-4-methyl-6-hydroxypyrimidine are suspended together with 42 grams (0.3 mol) of dry and sifted potassium carbonate in 150 cc. of methyl ethyl ketone. 51 grams (0.3 mol) of O,O-diethyl-phosphoric acid chloride are introduced dropwise at 40 to 50° C. The temperature of the reaction mixture rises to about 60° C. It is kept at 65 to 70° C. for three hours. The reaction mixture is then poured into water and then extracted with 300 cc. of benzene. The benzene solution is dried over sodium sulphate. The solvent is distilled off under reduced pressure. 20 grams of the ester of B.P. 110 to 115° C. at 0.01 mm. Hg are obtained by fractionational distillation as a pale yellow, water-insoluble oil.

The yield amounts 24% of the theoretical.

On rats the mean toxicity (DL$_{50}$) is 7.5 mg. per kg. of animal.

Spider mites are destroyed to an extent of 90% even by 0.001% solutions of the compound. Aphids and caterpillars are killed with certainty by 0.01% solutions.

*Example 8*

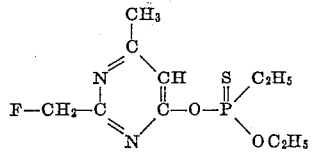

65.5 grams (0.4 mole) of the sodium salt of 2-fluoromethyl-4-methyl-6-hydroxypyrimidine are suspended in 150 cc. of methyl ethyl ketone and this suspension is mixed at about 50° C. with 69 grams (0.4 mol) of ethyl-thionophosphonic acid-O-ethyl ester chloride. The temperature of the mixture rises to about 70° C. The reaction mixture is then heated at 60 to 70° C. for a further 4 hours. The precipitate formed is then filtered off, and the product is dried over sodium sulphate. After distilling off the solvent, there are obtained 25 grams (23% of the theoretical yield) of the compound of the above formula, as a yellow oil of B.P. 88° C. at 0.04 mm. Hg.

On rats per os the mean toxicity of the product is about 20 mg. per kg. of animal.

Flies and house-crickets are completely destroyed by 0.001% solutions of the ester.

I claim:
1. A compound of the formula

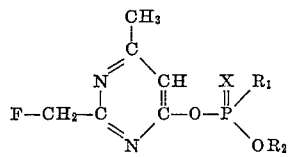

in which R$_1$ stands for a member selected from the group consisting of lower alkyl, phenyl, lower alkoxy and chloro-substituted lower alkoxy, R$_2$ stands for a member selected from the group consisting of lower alkyl and chloro-substituted lower alkyl, lower alkyl and lower alkoxy in each case having up to 4 carbon atoms and in which X is a chalkogen of an atomic weight less than 40.

2. The compound of the following formula

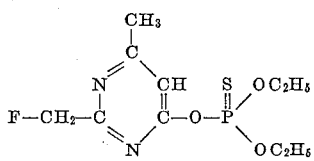

3. The compound of the following formula

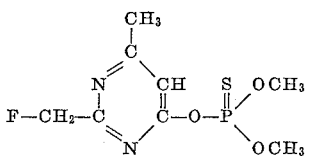

4. The compound of the following formula

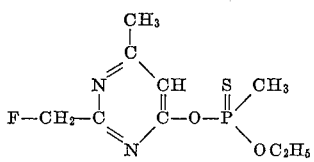

5. The compound of the following formula

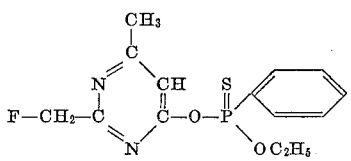

6. The compound of the following formula

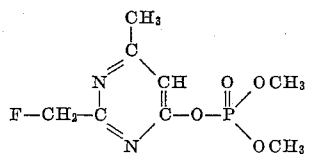

7. The compound of the following formula

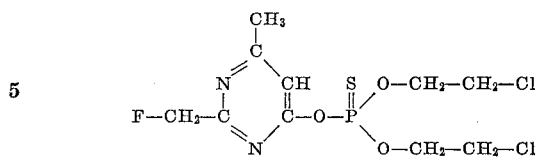

8. The compound of the following formula

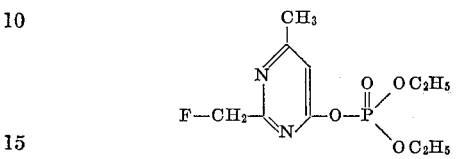

9. The compound of the following formula

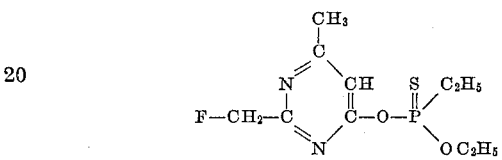

10. The compound of claim 1 wherein $R_1$ stands for lower alkoxy and $R_2$ stands for lower alkyl.

11. The compound of claim 1 wherein $R_1$ stands for chloro-substituted lower alkoxy and $R_2$ stands for chloro-substituted lower alkyl.

12. The compound of claim 1 wherein $R_1$ stands for phenyl and $R_2$ stands for lower alkyl.

13. The compound of claim 1 wherein $R_1$ stands for lower alkoxy, $R_2$ stands for lower alkyl and X stands for oxygen.

No references cited.

NICHOLAS S. RIZZO, *Primary Examiner.*

JOHN D. RANDOLPH, *Examiner.*